United States Patent
Hart et al.

(10) Patent No.: US 10,212,055 B2
(45) Date of Patent: Feb. 19, 2019

(54) SYSTEM AND METHOD FOR DYNAMICALLY GROUPING DEVICES BASED ON PRESENT DEVICE CONDITIONS

(71) Applicant: PTC Inc., Needham, MA (US)

(72) Inventors: David Patrick Hart, Webster, NY (US); John Louis Taylor, Webster, NY (US)

(73) Assignee: PTC Inc., Needham, MA (US)

( * ) Notice: Subject to any disclaimer, the term of this patent is extended or adjusted under 35 U.S.C. 154(b) by 0 days.

(21) Appl. No.: 15/275,782

(22) Filed: Sep. 26, 2016

(65) Prior Publication Data

US 2017/0085444 A1  Mar. 23, 2017

Related U.S. Application Data

(63) Continuation of application No. 14/317,151, filed on Jun. 27, 2014, now Pat. No. 9,491,071, which is a
(Continued)

(51) Int. Cl.
*H04L 12/24* (2006.01)
*H04L 12/26* (2006.01)
(Continued)

(52) U.S. Cl.
CPC .......... *H04L 43/04* (2013.01); *G06F 11/3055* (2013.01); *H04L 41/0681* (2013.01);
(Continued)

(58) Field of Classification Search
CPC ... H04L 41/00; H04L 41/0233; H04L 41/024; H04L 41/06; H04L 41/0604;
(Continued)

(56) References Cited

U.S. PATENT DOCUMENTS 4,086,434 A   4/1978   Bocchi
4,412,292 A   10/1983  Sedam et al.
(Continued)

FOREIGN PATENT DOCUMENTS

EP   0874306 A2   10/1998
EP   1191744 A2   3/2002
(Continued)

OTHER PUBLICATIONS 24.times.7, HealthTech Publishing Company, Inc. (Nov. 1996).
(Continued)

*Primary Examiner* — Eric W Shepperd
(74) *Attorney, Agent, or Firm* — Choate, Hall & Stewart LLP

(57) ABSTRACT

A method to dynamically group devices based on device information, which is associated with a system for monitoring the device information that communicates information between a device and an enterprise. Information is collected from a device information source to obtain an actual status of a device. The actual status of the device is compared to a stored status of the device. The stored status is stored on a server of the enterprise. The enterprise determines if the actual status has been changed from the stored status. When a change is detected, the method performs at least one of the acts of automatically disassociating the device from a group that reflects the stored status and automatically associating the device with a new group to reflect the actual status.

39 Claims, 4 Drawing Sheets

Related U.S. Application Data continuation of application No. 13/727,097, filed on Dec. 26, 2012, now Pat. No. 8,769,095, which is a continuation of application No. 11/538,402, filed on Oct. 3, 2006, now Pat. No. 8,370,479.

(51) Int. Cl.
  *G06F 11/30* (2006.01)
  *H04L 29/08* (2006.01)

(52) U.S. Cl.
  CPC ........ *H04L 41/0893* (2013.01); *H04L 43/065* (2013.01); *H04L 43/0817* (2013.01); *H04L 43/0876* (2013.01); *H04L 67/34* (2013.01)

(58) Field of Classification Search
  CPC . H04L 41/0613; H04L 41/0681; H04L 41/08; H04L 41/085; H04L 41/0853; H04L 41/0866; H04L 41/0893; H04L 41/22; H04L 43/00; H04L 43/02; H04L 43/04; G06F 11/30; G06F 11/3003; G06F 11/3051–11/3058
  See application file for complete search history.

(56) References Cited

U.S. PATENT DOCUMENTS

| | | |
|---|---|---|
| 4,497,037 A | 1/1985 | Kato et al. |
| 4,558,413 A * | 12/1985 | Schmidt .................... G06F 8/71 707/695 |
| 4,583,834 A | 4/1986 | Seko et al. |
| 4,853,946 A | 8/1989 | Elliott et al. |
| 4,962,368 A | 10/1990 | Dobrzanski et al. |
| 4,964,065 A | 10/1990 | Hicks et al. |
| 4,965,946 A | 10/1990 | Hegedus et al. |
| 4,996,703 A | 2/1991 | Gray |
| 5,038,319 A | 8/1991 | Carter et al. |
| 5,057,866 A | 10/1991 | Hill, Jr. et al. |
| 5,061,837 A | 10/1991 | Gilbert et al. |
| 5,062,147 A | 10/1991 | Pickett et al. |
| 5,077,582 A | 12/1991 | Kravette et al. |
| 5,084,875 A | 1/1992 | Weinberger et al. |
| 5,129,080 A | 7/1992 | Smith |
| 5,138,377 A | 8/1992 | Smith et al. |
| 5,163,151 A | 11/1992 | Bronikowski et al. |
| 5,184,179 A | 2/1993 | Tarr et al. |
| 5,204,699 A | 4/1993 | Birnbaum et al. |
| 5,212,645 A | 5/1993 | Wildes et al. |
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,315,580 A | 5/1994 | Phaal |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,420,978 A | 5/1995 | Tozawa et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholtz et al. |
| 5,736,965 A | 4/1998 | Mosebrook et al. |
| 5,740,801 A | 4/1998 | Branson |
| 5,745,268 A | 4/1998 | Eastvold et al. |
| 5,745,718 A | 4/1998 | Cline et al. |
| 5,748,892 A | 5/1998 | Richardson |

(56) References Cited

U.S. PATENT DOCUMENTS

| | | |
|---|---|---|
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Ezekiel |
| 5,798,738 A | 8/1998 | Yamada |
| 5,801,964 A | 9/1998 | McCarthy |
| 5,809,237 A | 9/1998 | Watts et al. |
| 5,809,297 A | 9/1998 | Kroenke et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama |
| 5,911,095 A | 6/1999 | Atsumi et al. |
| 5,917,405 A | 6/1999 | Joao |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |
| 5,956,698 A | 9/1999 | Lacheze et al. |
| 5,961,586 A | 10/1999 | Pedersen |
| 5,968,116 A | 10/1999 | Day, II et al. |
| 5,970,149 A | 10/1999 | Johnson |
| 5,974,234 A | 10/1999 | Levine et al. |
| 5,975,737 A | 11/1999 | Crater et al. |
| 5,991,810 A | 11/1999 | Shapiro et al. |
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,014,694 A | 1/2000 | Aharoni et al. |
| 6,016,535 A | 1/2000 | Krantz et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,023,721 A | 2/2000 | Cummings |
| 6,023,749 A | 2/2000 | Richardson |
| 6,025,925 A | 2/2000 | Davidson, Jr. et al. |
| 6,031,964 A | 2/2000 | Anderson |
| 6,041,041 A | 3/2000 | Ramanathan et al. |
| 6,042,111 A | 3/2000 | Rivers et al. |
| 6,057,857 A | 5/2000 | Bloomfield |
| 6,060,994 A | 5/2000 | Chen |
| 6,061,603 A | 5/2000 | Papadopoulos et al. |
| 6,064,915 A | 5/2000 | Kaneko et al. |
| 6,065,118 A | 5/2000 | Bull et al. |
| 6,081,623 A | 6/2000 | Bloomfield et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,118,899 A | 9/2000 | Bloomfield et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,141,737 A | 10/2000 | Krantz et al. |
| 6,152,365 A | 11/2000 | Kolls |
| 6,157,944 A | 12/2000 | Pedersen |
| 6,161,145 A | 12/2000 | Bainbridge et al. |
| 6,163,317 A * | 12/2000 | de Judicibus .......... G06F 3/0481 715/853 |
| 6,167,432 A | 12/2000 | Jiang |
| 6,167,448 A | 12/2000 | Hemphill et al. |
| 6,172,683 B1 | 1/2001 | Bloomfield |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 | 5/2001 | Mahajan et al. |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopoulos et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,289,461 B1 | 9/2001 | Dixon |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,307,570 B1 | 10/2001 | Stergiades |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,327,594 B1 | 12/2001 | Van Huben et al. |
| 6,338,086 B1 | 1/2002 | Curtis et al. |
| 6,343,320 B1 | 1/2002 | Fairchild et al. |
| 6,353,926 B1 * | 3/2002 | Parthesarathy .......... G06F 8/65 707/999.202 |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,552 B1 | 4/2002 | Bloomfield |

(56) References Cited

U.S. PATENT DOCUMENTS

| | | |
|---|---|---|
| 6,370,570 B1 | 4/2002 | Muir et al. |
| 6,370,582 B1 | 4/2002 | Lim et al. |
| 6,377,162 B1 | 4/2002 | Delestienne et al. |
| 6,377,971 B1 | 4/2002 | Madden et al. |
| 6,381,557 B1 | 4/2002 | Babula et al. |
| 6,397,212 B1 | 5/2002 | Biffar |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,437,803 B1 | 8/2002 | Panasyuk et al. |
| 6,438,598 B1 | 8/2002 | Pedersen |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |
| 6,502,132 B1 | 12/2002 | Kumano et al. |
| 6,510,350 B1 | 1/2003 | Steen, III et al. |
| 6,510,454 B1 | 1/2003 | Walukiewicz |
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,538,667 B1 | 3/2003 | Duursma et al. |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |
| 6,560,641 B1 | 5/2003 | Powderly et al. |
| 6,560,656 B1 | 5/2003 | O'Sullivan et al. |
| 6,564,227 B2 | 5/2003 | Sakakibara et al. |
| 6,567,813 B1 | 5/2003 | Zhu et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,591,272 B1 | 7/2003 | Williams |
| 6,598,011 B1 | 7/2003 | Howards Koritzinsky et al. |
| 6,601,087 B1 | 7/2003 | Zhu et al. |
| 6,601,159 B1 | 7/2003 | Smith et al. |
| 6,604,212 B2 | 8/2003 | Sekizawa |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,595 B2 | 12/2003 | McFadden |
| 6,675,197 B1 | 1/2004 | Satoh et al. |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,738,798 B1 | 5/2004 | Ploetz et al. |
| 6,754,664 B1 * | 6/2004 | Bush ................ H04L 29/06 |
| 6,757,714 B1 | 6/2004 | Hansen |
| 6,757,899 B2 | 6/2004 | Zhdankin et al. |
| 6,760,761 B1 | 7/2004 | Sciacca |
| 6,763,274 B1 | 7/2004 | Gilbert |
| 6,763,501 B1 | 7/2004 | Zhu et al. |
| 6,766,333 B1 | 7/2004 | Wu et al. |
| 6,775,238 B1 | 8/2004 | Suzuki |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 | 10/2004 | Kracht |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 * | 12/2004 | Miller ............... G05B 23/0289 340/3.1 |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,924,727 B2 * | 8/2005 | Nagaoka ........... H04L 12/2803 340/3.1 |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B1 | 2/2006 | Bahl |
| 7,016,966 B1 | 3/2006 | Saulpaugh et al. |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |

(56) References Cited

U.S. PATENT DOCUMENTS

| | | |
|---|---|---|
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,085,824 B2 | 8/2006 | Forth et al. |
| 7,089,567 B2 | 8/2006 | Girardot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,511 B2 * | 9/2006 | Petite .......... G05B 23/0208 340/870.06 |
| 7,103,799 B2 | 9/2006 | Dixon |
| 7,107,312 B2 | 9/2006 | Hackbarth et al. |
| 7,113,988 B2 | 9/2006 | Chirashnya et al. |
| 7,116,681 B1 | 10/2006 | Hovel et al. |
| 7,117,239 B1 | 10/2006 | Hansen |
| 7,117,243 B2 | 10/2006 | Peart |
| 7,123,141 B2 * | 10/2006 | Contestabile ...... G08B 21/0269 340/539.1 |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,143,153 B1 | 11/2006 | Black et al. |
| 7,149,792 B1 | 12/2006 | Hansen et al. |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,034 B2 * | 4/2008 | Haney .................. H04M 3/4228 455/411 |
| 7,353,253 B1 | 4/2008 | Zhao |
| 7,359,953 B2 | 4/2008 | Muir et al. |
| 7,376,695 B2 | 5/2008 | Duursma et al. |
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |
| 7,496,097 B2 | 2/2009 | Rao et al. |
| 7,502,726 B2 | 3/2009 | Panasyuk et al. |
| 7,502,784 B2 | 3/2009 | Collins |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford et al. |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,843 B2 * | 10/2009 | Alexander ......... G06F 17/30828 |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,831,599 B2 | 11/2010 | Kumar et al. |
| 8,065,397 B2 | 11/2011 | Taylor et al. |
| 8,165,893 B1 | 4/2012 | Goldberg et al. |
| 8,260,907 B2 | 9/2012 | O'Sullivan |
| 8,296,413 B2 | 10/2012 | Bornhoevd et al. |
| 8,370,479 B2 | 2/2013 | Hart et al. |
| 8,555,273 B1 * | 10/2013 | Chia ..................... G06F 8/665 717/168 |
| 8,769,095 B2 | 7/2014 | Hart et al. |
| 8,788,632 B2 | 7/2014 | Taylor et al. |
| 9,491,071 B2 | 11/2016 | Hart et al. |
| 2001/0007117 A1 | 7/2001 | Cooper et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka |
| 2001/0056547 A1 | 12/2001 | Dixon |
| 2002/0002580 A1 * | 1/2002 | Nurick .................. H04L 43/00 709/202 |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen et al. |
| 2002/0116550 A1 | 8/2002 | Hansen |
| 2002/0133753 A1 | 9/2002 | Mayberry et al. |
| 2002/0135801 A1 | 9/2002 | Tessman et al. |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063119 A1 | 4/2003 | Bloomfield et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0107490 A1 * | 6/2003 | Sznaider ................ G08B 21/10 340/601 |
| 2003/0118353 A1 | 6/2003 | Baller et al. |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu et al. |
| 2003/0200285 A1 | 10/2003 | Hansen et al. |
| 2003/0200329 A1 | 10/2003 | Delaney et al. |
| 2003/0229529 A1 | 12/2003 | Mui et al. |

(56) References Cited

U.S. PATENT DOCUMENTS

| | | |
|---|---|---|
| 2003/0229785 A1 | 12/2003 | Daseke et al. |
| 2004/0006614 A1* | 1/2004 | DiFalco .............. H04L 41/0893 |
| | | 709/223 |
| 2004/0027376 A1 | 2/2004 | Calder et al. |
| 2004/0030768 A1 | 2/2004 | Krishnamoorthy et al. |
| 2004/0083119 A1* | 4/2004 | Schunder ............. G06Q 10/10 |
| | | 705/1.1 |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Kouznetsov et al. |
| 2004/0158630 A1 | 8/2004 | Chang et al. |
| 2004/0158631 A1 | 8/2004 | Chang et al. |
| 2004/0172222 A1* | 9/2004 | Simpson ............ G06F 19/3418 |
| | | 702/189 |
| 2004/0177124 A1 | 9/2004 | Hansen |
| 2004/0186693 A1 | 9/2004 | Xiang et al. |
| 2004/0199272 A1 | 10/2004 | Yamamoto et al. |
| 2004/0199792 A1 | 10/2004 | Tan et al. |
| 2004/0210450 A1 | 10/2004 | Atencio et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinsky |
| 2005/0033588 A1 | 2/2005 | Ruiz et al. |
| 2005/0044196 A1 | 2/2005 | Pullen et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0114352 A1 | 5/2005 | Ronneburg et al. |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0182834 A1 | 8/2005 | Black |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0034281 A1* | 2/2006 | Cain ................... H04L 12/185 |
| | | 370/390 |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Kouznetsov et al. |
| 2006/0066448 A1 | 3/2006 | Berisford et al. |
| 2006/0069662 A1 | 3/2006 | Laborczfalvi et al. |
| 2006/0069668 A1 | 3/2006 | Braddy et al. |
| 2006/0069683 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0130073 A1 | 6/2006 | Faist et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri |
| 2006/0159432 A1 | 7/2006 | Mazzaferri |
| 2006/0161555 A1 | 7/2006 | Mazzaferri |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shahbazi |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu et al. |
| 2006/0271875 A1 | 11/2006 | Green et al. |
| 2006/0271877 A1 | 11/2006 | Theurer |
| 2006/0282521 A1 | 12/2006 | Anderson et al. |
| 2006/0288119 A1 | 12/2006 | Kim et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu et al. |
| 2007/0056009 A1 | 3/2007 | Spilo et al. |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0124476 A1 | 5/2007 | Oestereicher et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |

(56) References Cited

U.S. PATENT DOCUMENTS

| | | |
|---|---|---|
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154409 A1 | 6/2008 | Srikumar et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0117203 A1 | 5/2012 | Taylor et al. |

FOREIGN PATENT DOCUMENTS

| | | |
|---|---|---|
| EP | 1362282 A2 | 11/2003 |
| EP | 1695485 A2 | 8/2006 |
| FR | 2797728 A1 | 2/2001 |
| GB | 2305820 A | 4/1997 |
| JP | 60-263162 | 12/1985 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |
| JP | 10-190922 | 7/1998 |
| JP | 10-224372 | 8/1998 |
| JP | 11-203079 | 7/1999 |
| JP | 11-296453 | 10/1999 |
| JP | 2000-112863 A | 4/2000 |
| JP | 2000-122952 A | 4/2000 |
| JP | 2000-278773 A | 10/2000 |
| JP | 2000-309145 A | 11/2000 |
| JP | 2001-337817 A | 12/2001 |
| JP | 2003-223603 A | 8/2003 |
| WO | WO-9730879 A1 | 8/1997 |
| WO | WO-9820439 A1 | 5/1998 |
| WO | WO-9833302 A1 | 7/1998 |
| WO | WO-9838910 A1 | 9/1998 |
| WO | WO-9841943 A1 | 9/1998 |
| WO | WO-9921336 A1 | 4/1999 |
| WO | WO-9957649 A2 | 11/1999 |
| WO | WO-9957837 A2 | 11/1999 |
| WO | WO-9957838 A2 | 11/1999 |
| WO | WO-9964958 A1 | 12/1999 |
| WO | WO-0023894 A1 | 4/2000 |
| WO | WO-0210919 A2 | 2/2002 |
| WO | WO-0221239 A2 | 3/2002 |
| WO | WO-0221299 A1 | 3/2002 |
| WO | WO-0221414 A1 | 3/2002 |
| WO | WO-0221415 A1 | 3/2002 |
| WO | WO-0221777 A1 | 3/2002 |
| WO | WO-0225501 A2 | 3/2002 |
| WO | WO-03021464 A2 | 3/2003 |
| WO | WO-03054439 A2 | 7/2003 |
| WO | WO-2004059447 A2 | 7/2004 |
| WO | WO-2006009402 A1 | 1/2006 |
| WO | WO-2008083177 A1 | 7/2008 |

OTHER PUBLICATIONS

Action and Response History in U.S. Appl. No. 11/538,402.
Action and Response History in U.S. Appl. No. 09/667,737.
Action and Response History in U.S. Appl. No. 09/708,384.
Action and Response History in U.S Appl. No. 10/028,126.
Action and Response History in U.S Appl. No. 10/123,960.
Action and Response History in U.S Appl. No. 10/124,181.
Action and Response History in U.S Appl. No. 10/784,138.
Action and Response History in U.S. Appl. No. 11/503,638.
Action and Response History in U.S. Appl. No. 11/537,399.
Action and Response History in U.S Appl. No. 11/616,136.
Action and Response History in U.S Appl. No. 11/677,279.
Action and Response History in U.S Appl. No. 11/774,474.
Action and Response History in U.S. Appl. No. 13/252,357.
Adelberg, D., "Building Robust Wrappers for Text Sources", [online] Retrieved from the Internet<URL:http://student.bu.ac.bd/.about.mumit/Research/NLP-bib/pap-ers/Adelberg99.pdf> [retrieved on Nov. 24, 2008] (1999).
Al-Shaer, Ehab, A dynamic group management framework for large-scale distributed event monitoring, [Online] 2001 [Retrieved on Feb. 5, 2014, IEEE/IFIP International Symposium on Integrated Network Management Proceedings, pp. 361-374 [Retrieved form : http://ieeexplore.ieee.org/stamp/stamp.jsp?tp=&arnumber-918053].
Allegro Software product release 1-61 overview Greenhills Software Inc., [online] Jun. 10, 2002, pp. I-I, XP002201939 Retrieved from the Internet: <URL: http://www.ghs.com/partners/allegro/> [retrieved on Jun. 10, 2002] the whole document.
Allegro, RomWebCLient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/r-omwebclient.html.
Annex to EPO Form 2004 with claims for grant in European Application No. 01955993.9.
Application and Response History in U.S. Appl. No. 09/627,201.
Application and Response History in U.S. Appl. No. 09/716,717.
Application and Response History in U.S. Appl. No. 10/805,012.

(56) References Cited

OTHER PUBLICATIONS

Application and Response History in U.S. Appl. No. 11/677,279. Apr. 22, 2005 Literature Search by Keyword: CyberTAC.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Communication dated Apr. 26, 2005 in European Application No. 01955993.9.
Communication in EP Application No. 01973431.8, dated Mar. 30, 2005.
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 2001).
Dec. 27, 1995, SCAN Diagnostic Imaging, vol. 8, No. 24.
Defense Information Systems Agency, Field Services Office, White Paper Report "pcAnywhere 10.5" (Sep. 2003).
Eastvold, Roger, "Services: The Next Generation," The Professional Journal, vol. 20, No. 4.
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from theInternet<URL:http://www.cs.dartmouth.edu/.about.makedon/cs188/proposal-.html>, [retrieved Feb. 15, 2005].
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).
EmWare Press Release: "emWare Delivers EMIT 3.0 SDK Pro—A Complete Device Networking Kit for Developing End-to-end, Embedded Device Networking Solutions," Salt Lake City, UT (May 1999).
EmWare Press Release: "emWare's emLink (TM) Used to Internet-enable Welch Allyn's Vital Signs Monitor," Chicago, IL (Mar. 1999).
EmWare Press Release: "emWare, IBM Demonstrate Next Phase in Establishing Worldwide Access to Embedded Devices," Chicago, IL (Mar. 1999).
EmWare Press Release: "Invensys Selects emWare EMIT Device-Networking Software to Add Remote Monitoring and Control Capabilities to its Controller Products," Salt Lake City, UT (Jun. 1999).
EmWare Press Release: "Motorola, Mitsubishi and National Semiconductor Join emWare's Embed the Internet Alliance," Chicago, IL (Mar. 1999).
English translation of Notification of Reasons for Refusal in Japanese Application No. 2002-529431, dated Nov. 8, 2010.
Ennis, D., "CORBA and XML Integration in Enterprise Systems", IONA Technologies Inc.[online], Retrieved from the Internet<URL: http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
Examination Report in EP Application No. 01955993.9, dated Aug. 5, 2004.
Examination Report in EP Application No. 01955993.9, dated Dec. 16, 2004.
Examination Report in EP Application No. 01955993.9, dated Jan. 29, 2004.
Examination Report in EP Application No. 01973431.8, dated Feb. 6, 2009.
Examination Report in EP Application No. 01973431.8, dated Jan. 15, 2008.
Examination Report in EP Application No. 01973431.8, dated Mar. 23, 2010.
Examination Report in EP Application No. 01973431.8, dated Mar. 8, 2005.
Examination Report in EP Application No. 02792391.1, dated Mar. 10, 2010.
Examination Report in EP Application No. 03719774.6, dated Apr. 12, 2006.
Examination Report in EP Application No. 03719774.6, dated Sep. 12, 2005.
File History, U.S. Appl. No. 14/355,428, 278 pages.
File History, U.S. Pat. No. 8,065,397, 463 pages.
File History, U.S. Pat. No. 8,788,632, 385 pages.
Franklin, M. et al., "Data in Your Face: Push Technology in Perspective", Proc. ACM SIGMOD Int'l Conf. on Mgmt of Data, (Jun. 1998), #XP000886180, pp. 516-519.
Frequently Asked Questions about the Extensible Markup Language—The XML FAQ, Version 1.41 (http://www.oasis-open.org/cover/xmlFAQ141-19981006.html) (Oct. 6, 1998).
Hanckmann, J., "Telescript: The Emerging Standard for Intelligent Messaging," Philips Telecommunications Review, vol. 52(1), pp. 15-19 (Mar. 1994).
IBM Technical Disclosure Bulletin, Dynamic icon Navigation to Nested Containers, 34(8):386-388 (1992).
Incremona, A. "Remote Service Diagnostics for Imaging Equipment: Today and Tomorrow," Advanced Imaging, 12(9):90(2) (1997).
International Preliminary Examination Report in Application No. PCT/US01/23651, dated Oct. 10, 2002.
International Preliminary Examination Report in Application No. PCT/US01/29787, dated Aug. 21, 2002.
International Preliminary Examination Report in Application No. PCT/US01/45198, dated Apr. 2,2008.
International Preliminary Examination Report in Application No. PCT/US2002/040058, dated Jun. 10, 2004.
International Preliminary Report on Patentability in Application No. PCT/US2007/088858, dated Jul. 9, 2009.
International Search Report &. Written Opinion in Application No. PCT/US2007/088858, dated May 21, 2008.
International Search Report and Written Opinion in Application No. PCT/US03/11701, dated Oct. 13, 2004.
International Search Report in Application No. PCT/US01/23651, dated Jun. 3, 2002.
International Search Report in Application No. PCT/US01/29787, dated Jun. 28, 2002.
International Search Report in Application No. PCT/US01/45198, dated Apr. 29, 2003.
International Search Report in Application No. PCT/US03/11707, dated Sep. 24, 2003.
International Search Report in Application No. PCT/US2002/040058, dated Nov. 3, 2003.
Jennyc, Kenn S., "Linking Enterprise Business Systems to the Factory Floor," The Hewlett-Packard Journal, Article 9 (May 1998).
Jiang, et al., "Record-Boundary Discovery in Web Documents", [online] Retrieved from the Internet<URL:http://osm7.cs.byu.edu/deg/papers/SJ.Thesis.ps>, [retrieved on Nov. 24, 2008] (1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet<URL:http://www.intelligententerprise.com/010416/webhouse1.su-b.--1.jhtml> [retrieved on Nov. 24, 2008] (Apr. 16, 2001).
Koppen, E., et al., "Active Hypertext for Distributed Web Applications", Enabling Technologies: Infrastructure for Collaborative Enterprises, (WET ICE '99), Proc. IEEE 8th Intl. Workshop (1999), pp. 297-302.
Kovar, J., "Xerox Unveils Expanded Channel Lineup; Also Plans to Introduce E-Mail, Queue Management Software," PC Expo,(Jun. 1999).

(56) References Cited

OTHER PUBLICATIONS

Lassman, M. et al., "Modern Nuclear Medical Diagnostics with Efficient Gamma Cameras," Electromedica, 66(2):43-51, (1998).
Layman, et al., "XML-Data," Position Paper from Microsoft Corp. (Jun. 1997), [online] Retrieved from the Internet<URL:http://www.oasis-open.org/cover/xml-data9706223.html> [retrieved on Sep. 2, 2004].
Lerner, R., "At the Forge: Introducing SOAP", Linux Journal, #XP002292162 (Mar. 2001).
Letter from Foreign Associate regarding response filed in EP Application No. 01973431.8, dated Oct. 8, 2010.
Lewandowska, J., et al., "System for Grouping Technologically Similar Devices", v. 48 n 12; (Dec. 1975), pp. 636-638 (English Abstract).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Machine Translation of Japanese Application No. 2000-122952, published Apr. 2000.
Machine Translation of Japanese Patent Publication No. 09-305407 (Pub Date Nov. 1997).
Machine Translation of Japanese Patent Publication No. 11-203079, (Pub Date Jul. 1999).
Machine Translation of Japanese Patent Publication No. 11-296453, (Pub Date Oct. 1999).
Machine Translation of Japanese Patent Publication No. 2000-309145, (Pub Date Nov. 2000).
Machine Translation of Japanese Patent Publication No. 2001-337817, (Pub Date Dec. 2001).
Martin, D., "Protessional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet<URL:http://www.w3.org/TR/REC-MathML/chap4.sub.--4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet<URL:http://www.mecca.org/.about.ltague/nsfnocostextension.ht- ml>, [retrieved on Feb. 15, 2005].
Mills et al., "A knowledge-based method for inferring semantic concepts from visual models of system behavior," ACM (Jul. 2000), pp. 306-337.
Notice of Reasons for Rejection in Japanese Application No. 2002-529431, dated Nov. 8, 2010.
Office Action in U.S. Appl. No. 11/538,042, dated Jul. 14, 2011.
Office Action in EP Application No. 01955993.9, dated Jun. 6, 2005.
Office Action in EP Application No. 01996048.3, dated Jun. 22, 2004.
Office Action in EP Application No. 01996048.3, dated Mar. 11, 2005.
Oral Proceeding Minutes with European Application No. 01955993.9.
Orasis Medical Services, Inc., Business Plan Copy No. 001, (Nov. 1995).
Pfeiffer, R., "XML Tutorials for Programmers: Tutorial 2: Writing XML Documents," (1999) [online] Retrieved from the Internet<URL:http://imb.com/xml>, [retrieved on Mar. 2, 1999].
Prosecution History of U.S. Appl. No. 13/252,357 (downloaded Dec. 19, 2013).
Prosecution History of U.S. Pat. No. 8,065,397 (downloaded Dec. 19, 2013).
Questra Applications Data Sheet (2002).
Questra Preliminary Invalidity Contentions, dated Apr. 29, 2005.
Reagan, K., "Technology for the Soul," OC Metro, (Sep. 1, 1995).
Remote Diagnostics: Strategic weapon in the war for multi-vendor service contracts, Tech Assessment, 3(12) (Dec. 1995).
Response to Examination Report in EP Application No. 01973431.8, dated Oct. 4, 2010.
Result of Consultation of Nov. 24, 2005 and Nov. 25, 2005 from corresponding European Application No. 01955993.
Rytting, T., "Dispensing the Goods, Embedded Style," Circuit Cellar Online, (Oct. 1999).
Schmidt, The Evolution of Workflow Standards, IEEE (1999).
Search Report in EP Application No. 02792391.1, dated Nov. 19, 2009.
Searls, "The Next Bang: The Explosive Combination of Embedded Linux, XML, and Instant Mess.", ACM (Sep. 2000) Issue 77 [online] Retrieved from the Internet<URL:http://www.linuxjournal.com/article.php?sid=4195>, [retrieved on Nov. 20, 2001].
Second Auxiliary Response in EP Application No. 01973431.8, dated Apr. 26, 2011.
Siemens Medical, BJC Health System Extend deal to multivendor service, Medical Imaging News, vol. 6, No. 26, Jun. 27, 1997.
SOAP Archives Online, "Multiple Method Calls in SOAP Packet"; [online] Retrieved from the Internet<URL:http://discuss.develop.com/archives/wa.exe?A2=ind9912&L=-soap&T=O&F=8,S=8,P=25113>, [retrieved on Dec. 8, 2000].
Steinfeld, E., "From Standalone to Internet Appliance", Circuit Cellar Online, [online] (Jul. 9, 2000), #XP002201938, Retrieved from the Internet<URL:http://web.archive.org/web/20000709204234/http://www.ale-grosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Submission in German dated Nov. 25, 2005 from corresponding European Application No. 01955993.9.
Summons to attend oral proceedings in corresponding European Application No. 01955993.9 dated Oct. 31, 2005.
Summons to attend Oral Proceedings in counterpart EP Application No. 01973431.8, dated Feb. 2, 2011.
Suresh et al., "XML-based Data System for Earth Science Applications", IEEE 2000 International, vol. 3, pp. 242-228, Jul. 2000.
The Simple Times, vol. 7, No. 1, Mar. 1999; [online] Retrieved from the Internet<URL:http://www.simple-times.org/pub/simple-times/issues/7-1.- html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Universal Plug & Play Device Architecture, (C) Microsoft Corporation (Jun. 8, 2000), [online] Retrieved from the Internet: <URL:http://www.upnp.org/specs/arch/upnpda10.sub.--20000613.htm>, [retrieved on Nov. 24, 2008].
Van der Werff, M., et al., "A Mobile-Based Home Automatic System", IEEE Mobility Conference (2005).
Virtual Reality Transfer Protocol (VRTP); Retrieved from the Internet<URL:http://www.stl.nps.navy.mil/.about.brutzman/vrtp> (1998).
Walsh, Norman, "XSL the Extensible Style Language: Styling XML Documents," New Architect Daily, Jan. 1999.
Webmethods B2B Whitepaper; [online] Retrieved from the Internet<URL:http://www.cs.wisc.edu/.about.vganti/papers/b2b.sub.--wp-B2Bintegration.html> (1999).
White Paper, Medical Imaging, East Providence, RI (Sep. 1995).
Wigget, Jeremy, "Intraview: Roger Eastvold of Orasis Inc.," 24.times.7, Nov. 1996.
Williams, T., "Java Goes to Work Controlling Networked Embedded Systems" Computer Design, Pennwell Publ. Littleton, MA, 35:9:36-37, Aug. 1996.
Winer, Dave, "XML-Rpc Specification," (http://XML-RPC.com), Jun. 15, 1999.
Winter 1992, Field of View, vol. 2, No. 3, Toshiba America Medical System, Inc.
Written Opinion in Application No. PCT/US01/45198, dated May 31, 2007.
Wu et al., "A knowledge sharing and collaboration system model based on Internet", Systems, Man, and Cybernetics, 1999. IEEE SMC'99 Conference Proceedings, vol. 2, pp. 148-152 (1999).

(56) References Cited

OTHER PUBLICATIONS

Xerox 190 Copier, Electronic Data Interface Operator Guide, ver. 1.0, (1989).

* cited by examiner

SYSTEM AND METHOD FOR DYNAMICALLY GROUPING DEVICES BASED ON PRESENT DEVICE CONDITIONS

CROSS-REFERENCE TO RELATED APPLICATIONS

This patent application is a continuation of U.S. patent. application Ser. No. 14/317,151, entitled "A SYSTEM AND METHOD FOR DYNAMICALLY GROUPING DEVICES BASED ON PRESENT DEVICE CONDITIONS" and filed on Jun. 27, 2014 (which issued as U.S. Pat. No. 9,491,071 on Nov. 8, 2016), which is a continuation of U.S. Pat. application Ser. No. 13,727,097, entitled "A SYSTEM AND METHOD FOR DYNAMICALLY GROUPING DEVICES BASED ON PRESENT DEVICE CONDITIONS" and filed on Dec. 26, 2012 (which issued as U.S. Pat. No. 8,769,095 on Jul. 1, 2014), which is a continuation of U.S. patent application Ser. No. 11/538,402, entitled "A SYSTEM AND METHOD FOR DYNAMICALLY GROUPING DEVICES BASED ON PRESENT DEVICE CONDITIONS and filed on Oct. 3, 2006 (which issued as U.S. Pat. No. 8,370,479 on Feb. 5, 2013). The contents of U.S. patent. applications Ser. Nos. 14/317,151, 13,727,097, and 11/538,402 are hereby incorporated by reference into this application as if set forth herein in full.

BACKGROUND

Field of the Art

The present disclosure generally relates to monitoring devices and, more particularly, to dynamically grouping devices based on present device conditions.

Background and Relevant Art

Device manufacturers have typically created hierarchical groups of data to organize the network environment based on criteria such as geography, customer base, service organization, or other similar information that has been used to identify the groups. Earlier, the grouping was created either manually or based on statically entered information about the device. Recent systems have started to use existing parameters to automatically group computing devices based on criteria, such as response time, items in a given group, or transmission distance.

A system for dynamically grouping computing devices is disclosed in U.S. Patent Application Publication No. 2005/0193099 to Reus et al. The computing device transmitted a query and received a response including a neighbor-casting group. The group was selected based on predetermined criteria from the computing device. The criteria included the number of computing devices in the selected group, the amount of time between the query and the response from the selected group, or a combination of the number and time. The computing device could select one other group, remove itself from a group, or join the other selected group. The groups are automatically maintained as other devices are added to and removed from a domain or local area network so that no group grows inappropriately large. The group selection focuses solely on response time and number of computing devices in the system.

In a system disclosed in U.S. Pat. No. 7,079,010 to Champlin, information technology was monitored. The system included a monitor agent that was configured to collect performance and availability metrics associated with a host machine, a network, an operating system, a database or an application. The metrics were transferred to a data loader by the monitor agent. The monitor agent would generate alerts, which were sent to an escalation server. The alerts received by the escalation server could be grouped based on the metric type. The metrics were compared to configured alert thresholds to generate two types of alerts—a "warning" condition and a "critical" condition. The grouping was static, however, and did not adjust when the status of the information technology changed.

International publication number WO/2006/009402 to NHN Corp. disclosed an event alerting system and a method dynamically grouping for an event alert. An event message was sent to a client when an event was generated by the client or an alerting server. The clients were grouped according to transmission distance to the client by the alerting server. A client list and an alerting data packet were transmitted to master clients selected by the grouping process. The client list and data packet were also transmitted to a master client of an upper group to the last layer, which was established by performing the grouping process again. The groups are dynamically arranged from a generated list based on the transmission distance in each process of grouping the alerts.

In U.S. Patent Application Publication No. 2006/0200494 to Sparks, a distributed computing system is disclosed that conforms to a multi-level, hierarchical organizational model. Control nodes provide automated allocation and management of computing functions and resources within the distributed computing system in accordance with the organization model. The model includes four distinct levels: fabric, domain, tiers, and nodes. These levels provide for logical abstraction and containment of physical components as well as system and service application software of the enterprise. An administrator interacts with the control nodes to logically define the hierarchical organization of the distributed computing system. The control node detects the node added to the network and automatically identifies attributes for the detected node. This system, however, does not dynamically group devices based on changes associated with the device.

Related technologies have used systems that group devices in various areas. For example, remote device management systems have been used to create hierarchical groupings for such things as device access (authorization), alert escalation, bulk device operations (e.g., content distribution and communication scheduling), and business workflow management.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In a system for monitoring device information that communicates information between a device and an enterprise, a method is provided for dynamically grouping the device. The process collects information from a device information source to obtain an actual status of a device. The process compares the actual status of the device to a stored status of the device. The stored status is stored in a database of the enterprise. In the enterprise, the process determines if the actual status has been changed from the stored status. When the change is detected, the device is automatically disassociated from groups that reflect the stored status and/or automatically associates with new groups to reflect the actual status.

In another aspect of the invention, a method for dynamically grouping devices is provided in a system for monitoring device information that communicates information between a device and an enterprise. At least one of a new software and hardware is installed to the device. Information is collected from a device information source to obtain an actual status of the device. The device is automatically associated with groups to link the device to a defined rule.

In a further aspect of the invention, a system for dynamically grouping devices is associated with a monitor agent that monitors a device. The system includes a server that communicates with the device. The device is configured to collect information to obtain an actual status of the device. The system also includes an enterprise that is configured to compare the actual status of the device to collected information previously stored on the device and to determine whether the actual status has been changed from the stored status. When the actual status is changed, the device is automatically disassociated from groups that reflect the stored status and/or automatically associated with new groups to reflect the actual status.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE INVENTION

Figure 1:
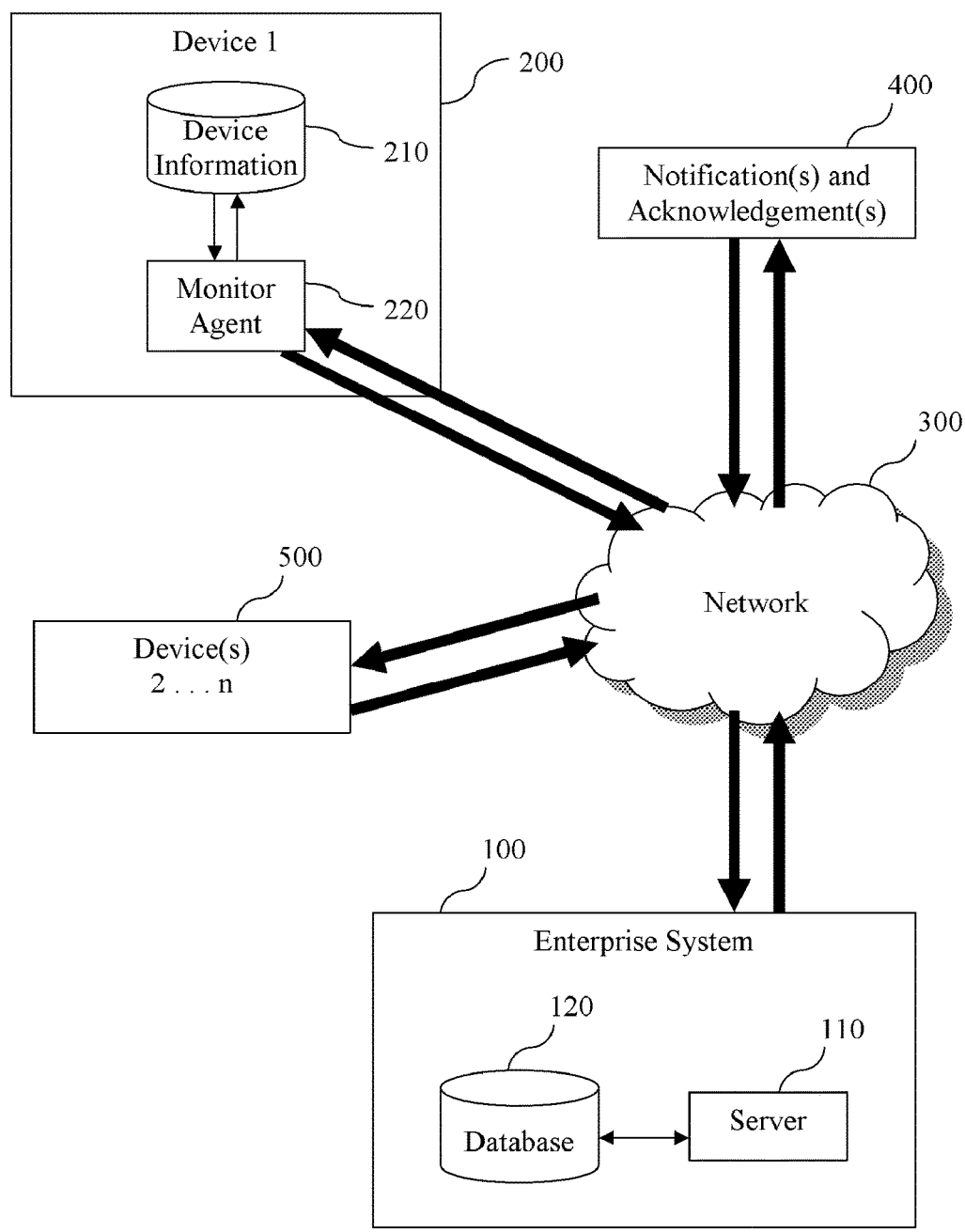
FIG. 1 illustrates a system for dynamically grouping devices in accordance with the various embodiments of the present invention.

The present system and method includes various embodiments of dynamically grouping devices based on present device conditions. Software has been developed to monitor the running conditions, wearing components, break down and maintenance conditions, and the like in many different devices. These devices are usually monitored individually. For example, when the toner level in a copier is low, a warning is displayed on the unit.

Other devices, such as medical equipment, computers, pumps, and compressors, to name a few, are also monitored continually. In the present invention, the device can include any system or apparatus in which data is collected. The users typically observe the information received from the device, interact with it, and/or perform actions using the system associated with the device. Some actions may include: service actions, sales events, research and development, performance tracking, and other events related to the device. This collected information can be voluminous and hard to track, especially when hundreds or thousands of devices are being tracked by an enterprise.

The present invention dynamically groups these devices into specific categories and tracks a device based on rules that are established by the users. The device includes a monitor agent that actively monitors and collects information. When the device meets a defined rule, the device communicates with the enterprise. The enterprise takes action once data is received from the device. The device can communicate with the enterprise intermittently, at a given time, or when an event occurs. The communication between the device and the enterprise occurs remotely over the global computer network or through a local network. The device can generate a notification, such as an alarm or alert. When a condition to a rule is met, a notification can be sent to a group hierarchy. The enterprise evaluates rules when a change in the status of a device is received.

The devices are grouped based on certain criteria, such as geography, software application, version, extension, device type, model number, installation, division, or other device parameter. A device can be added or removed from a given group dynamically without requiring input from any user. The movement in and out of groups can occur when an event triggers the group evaluation, such as (a) after device registration or profile updates, (b) when receiving new device operational, status, environmental data, (c) when receiving new configuration information (i.e. new versions), or (d) when alarms and/or alerts are created for a device. These groups are created automatically and may define where notifications are sent and associate other business logic to devices, such as data collection schedules, software/patch distribution schedules, and the like. The groups are arranged or created such that an administrator is no longer required review each device to verify present device conditions.

The devices are associated with defined groups in the system, which creates many advantages. For example, groups help organize the devices so users can locate the device easily. In addition, "bulk" operations can be performed on multiple devices. These operations, for instance, include: data collection, such as data readings, configuration information, file transfers, and the like; and software updates. The groups can also control escalation of alert notifications. Furthermore, they can be used to control access to devices, for example, which users can view or change information regarding certain devices.

Referring to Fig. 1, in In the embodiments of the invention, the system includes an enterprise system 100 that communicates with at least one device 200 through a local or global computer network 300, such as the Internet, World Wide Web, or other similar network. The enterprise system 100 includes a server 110 that is connected to a database 120. The device 200 communicates with the enterprise 100 at predefined intervals. The device, for instance, can include a power meter, MRI machine, printing press, X-Ray machine, or other devices that include, or can be adapted to include, a monitor agent. These devices may vary in complexity and may have a set of subsystems associated with them.

The device 200 contains or is connected through a serial port, USB, network, or the like to a monitor agent 220. The monitor agent 220 is configured to monitor the device status and verify that the device is properly functioning and maintained. The monitor agent 220 communicates device information to the enterprise 100 as requested by enterprise users or when monitored conditions are met, as defined by rules. The rules can include monitoring rules, which are set up by the user in the monitor agent 220 on the device side, or dynamic group rules, which are set up by the enterprise user to monitor an active status of the devices that belong to the defined group. The status includes operational status, data readings, or configuration of the device.

The server 110 in the enterprise system 100 interacts with the monitor agent 220 to communicate the collected data from the monitor agent 220 to the enterprise system 100. When the data collected from the devices 200 meet a specified condition, a notification or set of notifications 400 can be created by the monitor agent 220 or the enterprise system 100 as discussed in further detail below. The notifications 400 can be sent to recipients inside or outside the local network associated with the device 200.

Other devices 500 can be connected to the enterprise system 100 through the global computer network 300 or other local network. The devices 500 are represented as systems 2 through n to mean any defined amount of devices, which can meet, but not exceed, the capacity of the enterprise system 100. As the users' needs grow, the enterprise system 100 can be modified to match the users' needs, for example, by adding more bandwidth, servers, and/or database capacity. Each of the other user systems 500 includes similar components as those defined in the device 200.

The monitor agent 220 collects information from the sources of device data, such as a database, a registry, the file system, or data collection protocols. The type of data can include various classes of information including: monitoring data, usage data, and configuration data. This data, for example, can include the operational status, operational data, usage information, location information, environmental information, software/hardware (SW/HW) version information (i.e. "configuration" information), or any data available on the device that can be communicated to the enterprise 100. To collect the data, the monitor agent 220 uses plug-in modules to collect device information using either standard or device-proprietary methods. The monitor agent 220 sends data to the enterprise using Web services. The software is not limited to a specific protocol such as simple mail transfer protocol (SMTP) or hypertext transfer protocol (HTTP) but may be adapted to any protocol known by one skilled in the art for data interchange at the hardware device level or at application program level.

The administrator reviews the type of information to set up monitoring rules that interact or perform actions with respect to the device and track current device parameters. The administrator can also set up dynamic group rules at the same time. These rules are based on business logic and can be changed and modified at any time, which will be discussed later in more detail below. The monitor agent software is used to collect data that can be used to locally monitor the data and evaluate the monitoring or dynamic group rules, or sent to the enterprise where it can be monitored and trigger other processing, like dynamic grouping.

Once the plug-in modules are integrated with the monitor agent 220, the status of the device is checked against the dynamic group rules and monitoring rules. During the process, the data from the device also triggers dynamic grouping in the system. The device can be evaluated at a triggering event, at a specific time, after updates or revisions, at the user's request, or at other prescribed intervals. The monitor agent 220 sends data sets of information to an enterprise server at the time of the triggering event and just before and after the event to capture the condition of the device. The data can also be collected at a specific time, such as every evening or at the close of business. Each time the device is updated or software revisions are installed, the data also can be collected. If the user needs information outside the prescribed times, a user request can be sent at any time. For instance, if a user wants to verify the configuration of the device and does not want to wait for a prescribed time, a request can be sent immediately.

The communication between the monitor agent 220 and the enterprise 100 can be rejected due to firewalls, NAT, etc. that are implemented to block unwanted communication. The system can use a "polling server" model to enhance the ability to communication between the device and the enterprise if needed. The "polling server" model is discussed, for example, in U.S. Patent Publication No. 2003/0118353 entitled Method and Apparatus for Managing Intelligent Assets in a Distributed Environment, which is hereby incorporated by reference in its entirety.

A group hierarchy is created. The group hierarchy can include dynamically and statically defined groups, where dynamic group hierarchies start at a statically defined root group. A dynamically defined group is a group to which devices are assigned automatically. To set up a dynamic group, the user defines it by setting up criteria against which the devices are evaluated to determine their membership in the group. The statically defined group is a group whose device membership has been manually defined by an administrator. The administrator creates the group and associates devices with it. When a new device is added to the system, the administrator manually associates it with a static group. The dynamic hierarchical groups are created based on analysis of dynamic group rules and information collected directly from the device.

A dynamic group rule can be created to specify how devices will be automatically organized into groups when those devices are manually created or provide information to the enterprise. Devices can be automatically associated with groups based on a set of rules or some aspect of their profiles. As devices are added to the system or provide updated information to the enterprise, they are automatically associated with the applicable dynamic groups. A dynamic group rule causes groups to be created. The first time a device is found to match the membership criteria for a dynamic group that group is created. The static and dynamic groups have a parent group. Those at the top level have a special built-in logical parent are called a root. Groups whose parent is the root are called root groups.

Automatic groupings can be created based on device configuration data. For example, the group can be defined from the software, firmware, hardware revision information, as well as other actual configuration information. The groups are matched with configuration baselines defined on the enterprise system 100.

The groups can also be automated based on extended and configurable registration information. The information, for example, can include device location, such as country, state, city, building, etc., or other customer information, like company name, group, responsible party, and other identifying information.

Business rules can also be applied at the device or the enterprise. The device can be grouped according to the business rule. For example, devices can be grouped based on a dynamic device property exceeding a threshold, such as a temperature, duration, pressure, or the like. If the collected information of the device meets a monitoring rule, then information can be sent to the enterprise where the system evaluates the collected information for dynamic group evaluation. The addition and removal of devices to and/or from groups manages the group-based business logic. The group-based business logic is disassociated from a group when the device is automatically disassociated from the group and group based business logic is associated to a new group when the device is automatically associated with the new group.

Automatic grouping also can be based on a device condition, such as an alert or an alarm. Alarms can be created by the monitor agent or by the enterprise system that monitors rules. When an alarm or alert is created, it triggers dynamic group rule evaluation. Alarms and alerts are defined by rules or business logic, which will be discussed below. The devices that are in a specified alert state, that is, meet a condition defined by a rule, can all be grouped together. The notifications of such a condition can be sent out to recipients, such as field service technicians, device operators, etc. on a group level when the devices are grouped based on a specific alert state. Business logic can also be applied to groups. The business logic is applied to or removed from devices that enter or leave a dynamic group, respectively.

A dynamic group rule can create a hierarchy of groups, not just one flat group. A device can belong to multiple groups and subgroups in the hierarchy. The user selects which static groups to associate with the device or creates a rule specifying the device data that should be used to match the current device conditions. During the selection process, for instance, the user may choose to group the device by location, device type, and software application. The device location may be a high level group, which includes many other device types. Thus, the device type group becomes a subgroup of the device location group. Likewise, different software application groups may be found in the device type group making it a subgroup of the device type group. This relationship creates a hierarchy of groups and subgroups— the subgroups being defined within another group. Some groups may be entirely defined within a group while others may be partially defined within the group. The hierarchical groups are defined accordingly for each device.

The devices are initially defined within hierarchical groups but the groups can dynamically change over time. In addition to device information changing, the dynamic group rule can change, which also changes the group membership. An exemplary embodiment of the process is found in FIG. 2. This process can be applied when the information is collected from the device, for example, when the device is initially installed or some other event occurs. The process of dynamic grouping starts by receiving device information from the monitor agent at step S20. The process then proceeds to step S21 where the actual status of the device is compared against the stored status. If the status of the device or the group rule has changed, then it proceeds to the next step S22. In step S22, the device information is evaluated for dynamic group membership. Then, the enterprise system in step S23 checks whether an existing group has been defined for the change in status of the device or the rule. If a group does not exist for the group, then a new group is created in step S24. For example, if the software application was version 3.0 but was updated to version 3.1 and a group for version 3.1 has not been created, then a new version 3.1 group is created. Next, the device is associated with the new group created in step S24 and disassociated from the outdated group in step S25. Continuing from the previous example, the device is associated to the version 3.1 group and disassociated from the version 3.0 group. If the device status or the group rule has not changed in step S21, then the process ends.

Rules can be set up at the group level to send a notice when a condition is met. For example, a rule can be created to notify the group when a temperature of a device exceeds a limit. Another rule can be set for the device when the temperature goes below a limit. Each rule is created based on the user's needs and what criteria the user wishes to monitor for a given device.

Figure 2:
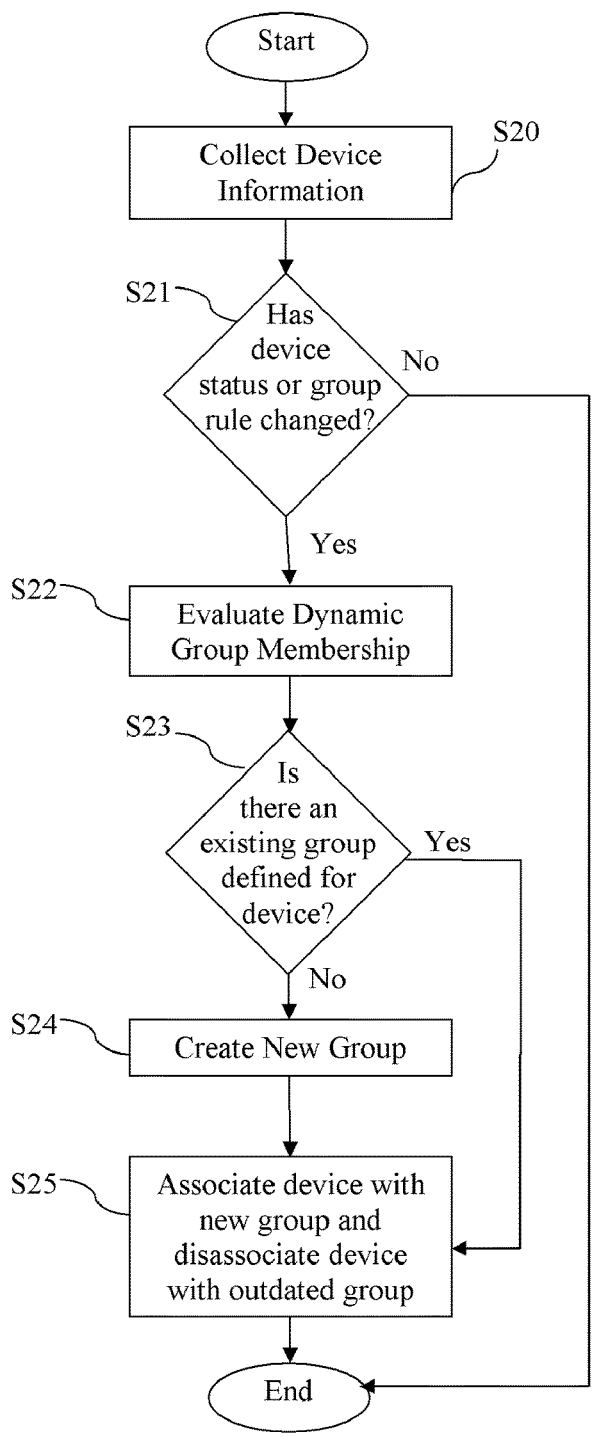
FIG. 2 is a flowchart illustrating a method of dynamically grouping devices in accordance with one exemplary embodiment.

Continuing with the process in FIG. 2, if a group already exists for the defined group in step S23, then the process goes to step S25 where the device is associated with the new existing group and disassociated from the outdated group. Then the process ends.

Figure 3:
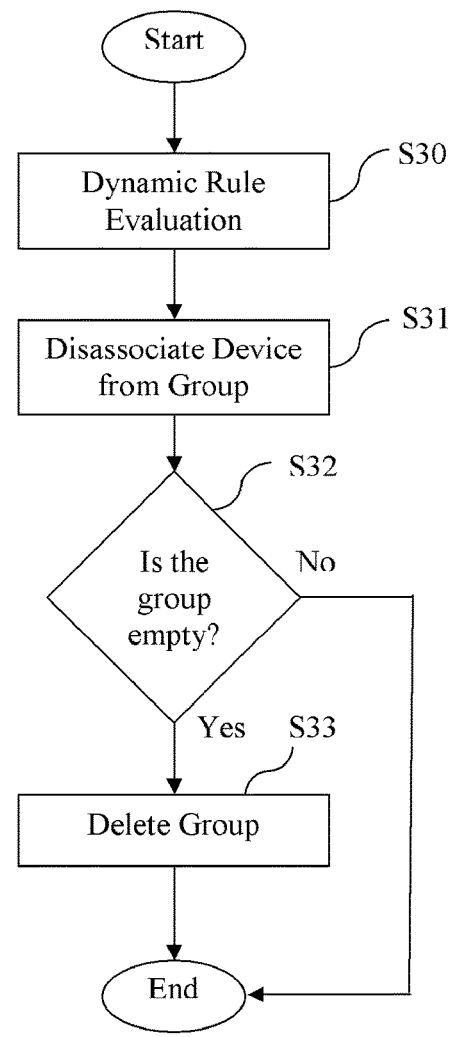
FIG. 3 is a flowchart illustrating a method of dynamically grouping devices and deleting empty groups in accordance with one exemplary embodiment.

A group can be deleted if it is empty. Alternatively, the user can choose to maintain the group, for example, if the user intends to reinstall the device or application that would use the group at some point. FIG. 3 illustrates an automated process for deleting empty groups. In step S30, device information is received that triggers dynamic rule evaluation. The enterprise system then disassociates the device from a corresponding group or set of groups in step S31. Once the system completes the evaluation and has updated the device groups, the enterprise system checks for any empty groups in step S32. If the group is empty, the enterprise system automatically deletes the group in step S33. If the disassociated group is not empty, then the process ends.

The monitor agent communicates over the global computer network, such as the Internet, with a server in the enterprise system. The system can use, for example, extensible markup language (XML) or any other known format to communicate in a common language.)ML is flexible and can create common information formats to share between the device and the enterprise system in a consistent way.

In one embodiment of the present invention, the notifications are defined as alarms and alerts. The alarm is a notification that is sent when a condition exists. For example, an alarm can be triggered when the temperature of the device exceeds a preset limit. The alarm is tracked and stored in a database. An alert is a notification of a recommended or required action based on a condition. One alarm can generate multiple alerts.

In an alternative embodiment, the notifications can escalate. After a notification has been sent to a group, if it has not been acknowledged within a defined time limit, then the notification is escalated to the next higher-level group in the hierarchy. And if the notification is not acknowledged on the higher level, then it is escalated to the next group and so forth. If the notification is acknowledged within the defined time limit, then it will not escalate to the next group. The time limit can be any defined amount of time. Typically, the time limit is defined in hours. In one example, the time limit may be set between three and five hours from the notification. The selection of a time limit is not limited to any particular range since it is based on user input.

Figure 4:
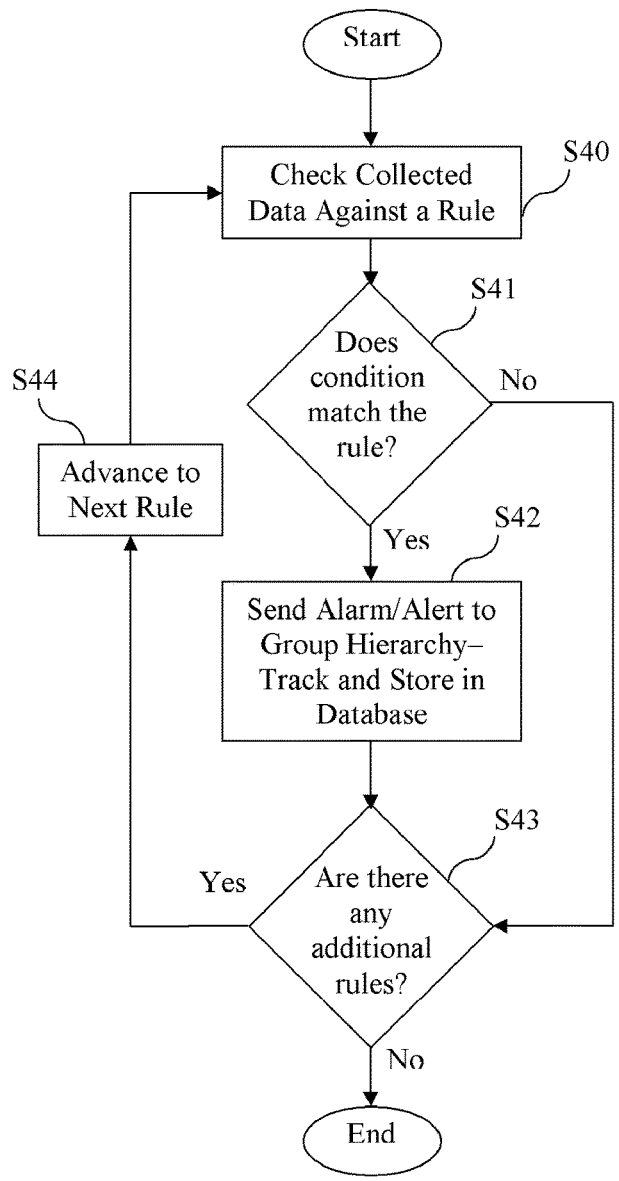
FIG. 4 is a flowchart illustrating a method of evaluating rules associated with groups in accordance with one exemplary embodiment.

FIG. 4 illustrates an exemplary embodiment of the notification escalation. First, the data that is collected from the device is evaluated and compared against the user defined rules, including monitoring rules and dynamic group rules, in step S40. In step S41, the process determines whether the collected data meets a condition of the rule. If it does, an alarm or alert is sent to the group hierarchy in accordance with the defined rule in step S42. The information is tracked and stored in a database for later reference. Next, the process checks whether there are any additional rules to be evaluated in step S43. If so, the process is advanced to the next rule in step S44, which is compared in step S40. If the condition is not met in step S41, then it goes to step S43 to check if any additional rules exist. If there are no additional rules in step S43, then the process ends.

The enterprise system 100 can include the various embodiments discussed above. The information collected from the devices is managed through the enterprise system 100 to reduce tile administrative time it takes to monitor each device individually. The system groups the devices based on collected information into a group hierarchy. The groups are dynamically created to cut down the amount of time it takes a user to manually create, modify, or delete groups of devices. The rules arc created at the group level to track updates, revisions, maintenance issues, and/or other modifications that should be or have been completed on each of the devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a server, the method comprising:
   receiving information from a monitoring agent associated with a device that is monitored;
   identifying an event associated with the device based on the information;
   performing a group evaluation in response to identifying the event;
   adding the device to a group based on the group evaluation, the device being added to the group automatically based on one or more predefined rules, the group containing multiple devices including the device that is monitored; and
   in response to adding the device to the group, applying business logic to the multiple devices in the group, wherein the business logic specifies performing, over a computer network, an operation on the multiple devices in the group.

2. The method of claim 1, wherein the information is from at least one of a time prior to the event, a time of the event, or a time following the event.

3. The method of claim 1, wherein the operation comprises sending data to, or receiving data from, the multiple devices; and
   wherein the data comprises a software update.

4. The method of claim 1, wherein the operation comprises sending data to, or receiving data from, the multiple devices; and
   wherein the data comprises configuration data for at least some of the multiple devices.

5. The method of claim 1, wherein the operation comprises sending data to, or receiving data from, the multiple devices; and
   wherein the data comprises readings from at least some of the multiple devices.

6. The method of claim 1, further comprising:
   polling the monitoring agent;
   wherein the information is received in response to the polling.

7. The method of claim 1, wherein the group is part of a hierarchy of groups, the device belonging to multiple groups in the hierarchy of groups.

8. The method of claim 1, wherein the group is part of a hierarchy of groups, the hierarchy of groups comprising one or more groups that are defined statically and one or more groups that are defined dynamically, the group being among the one or more groups that are defined dynamically.

9. The method of claim 1, wherein the information comprises a status of the device, and the event comprises the status meeting a predefined condition.

10. The method of claim 1, further comprising:
    outputting a notification based on a condition of the device.

11. The method of claim 10, wherein the notification comprises an alarm indicative of an existence of the condition, and one or more alerts that are based on the alarm, the one or more alerts identifying an action to take based on the condition.

12. The method of claim 10, further comprising:
    storing data representing the notification in a database that tracks information about the device.

13. The method of claim 10, further comprising:
    waiting, for a time, for acknowledgement of the notification; and
    absent acknowledgement of the notification within the time, escalating the notification within a hierarchy.

14. Non-transitory computer-readable storage storing instructions that are executable on at least one server, the instructions for performing operations comprising:
    receiving information from a monitoring agent associated with a device that is monitored;
    identifying an event associated with the device based on the information;
    performing a group evaluation in response to identifying the event;
    adding the device to a group based on the group evaluation, the device being added to the group automatically based on one or more predefined rules, the group containing multiple devices including the device that is monitored; and
    in response to adding the device to the group, applying business logic to the multiple devices in the group, wherein the business logic specifies performing, over a computer network, an operation on the multiple devices in the group.

15. The non-transitory computer-readable storage of claim 14, wherein the information is from at least one of a time prior to the event, a time of the event, or a time following the event.

16. The non-transitory computer-readable storage of claim 14, wherein the operation comprises sending data to, or receiving data from, the multiple devices; and
    wherein the data comprises a software update.

17. The non-transitory computer-readable storage of claim 14, wherein the operation comprises sending data to, or receiving data from, the multiple devices; and
wherein the data comprises configuration data for at least some of the multiple devices.

18. The non-transitory computer-readable storage of claim 14, wherein the operation comprises sending data to, or receiving data from, the multiple devices; and
wherein the data comprises readings from at least some of the multiple devices.

19. The non-transitory computer-readable storage of claim 14, wherein the operations comprise:
polling the monitoring agent;
wherein the information is received in response to the polling.

20. The non-transitory computer-readable storage of claim 14, wherein the group is part of a hierarchy of groups, the device belonging to multiple groups in the hierarchy of groups.

21. The non-transitory computer-readable storage of claim 14, wherein the group is part of a hierarchy of groups, the hierarchy of groups comprising one or more groups that are defined statically and one or more groups that are defined dynamically, the group being among the one or more groups that are defined dynamically.

22. The non-transitory computer-readable storage of claim 14, wherein the information comprises a status of the device, and the event comprises the status meeting a predefined condition.

23. The non-transitory computer-readable storage of claim 14, wherein the operations comprise:
outputting a notification based on a condition of the device.

24. The non-transitory computer-readable storage of claim 23, wherein the notification comprises an alarm indicative of an existence of the condition, and one or more alerts that are based on the alarm, the one or more alerts identifying an action to take based on the condition.

25. The non-transitory computer-readable storage of claim 23, wherein the operations comprise:
storing data representing the notification in a database that tracks information about the device.

26. The non-transitory computer-readable storage of claim 23, wherein the operations comprise:
waiting, for a time, for acknowledgement of the notification; and
absent acknowledgement of the notification within the time, escalating the notification within a hierarchy.

27. A system comprising:
at least one server; and
non-transitory computer-readable storage storing instructions that are executable on the at least one server, the instructions for performing operations comprising:
receiving information from a monitoring agent associated with a device that is monitored;
identifying an event associated with the device based on the information;
performing a group evaluation in response to identifying the event;
adding the device to a group based on the group evaluation, the device being added to the group automatically based on one or more predefined rules, the group containing multiple devices including the device that is monitored; and
in response to adding the device to the group, applying business logic to multiple devices in the group, wherein the business logic specifies performing, over a computer network, an operation on the multiple devices in the group.

28. The system of claim 27, wherein the information is from at least one of a time prior to the event, a time of the event, or a time following the event.

29. The system of claim 27, wherein the operation comprises sending data to, or receiving data from, the multiple devices; and
wherein the data comprises a software update.

30. The system of claim 27, wherein the operation comprises sending data to, or receiving data from, the multiple devices; and
wherein the data comprises configuration data for at least some of the multiple devices.

31. The system of claim 27, wherein the operation comprises sending data to, or receiving data from, the multiple devices; and
wherein the data comprises readings from at least some of the multiple devices.

32. The system of claim 27, wherein the operations comprise:
polling the monitoring agent;
wherein the information is received in response to the polling.

33. The system of claim 27, wherein the group is part of a hierarchy of groups, the device belonging to multiple groups in the hierarchy of groups.

34. The system of claim 27, wherein the group is part of a hierarchy of groups, the hierarchy of groups comprising one or more groups that are defined statically and one or more groups that are defined dynamically, the group being among the one or more groups that are defined dynamically.

35. The system of claim 27, wherein the information comprises a status of the device, and the event comprises the status meeting a predefined condition.

36. The system of claim 27, wherein the operations comprise:
outputting a notification based on a condition of the device.

37. The system of claim 36, wherein the notification comprises an alarm indicative of an existence of the condition, and one or more alerts that are based on the alarm, the one or more alerts identifying an action to take based on the condition.

38. The system of claim 36, wherein the operations comprise:
storing data representing the notification in a database that tracks information about the device.

39. The system of claim 36, wherein the operations comprise:
waiting, for a time, for acknowledgement of the notification; and
absent acknowledgement of the notification within the time, escalating the notification within a hierarchy.

* * * * *